(12) United States Patent  (10) Patent No.: US 7,480,134 B2
Cheng  (45) Date of Patent: Jan. 20, 2009

(54) DEVICE ENABLING A NOTEBOOK COMPUTER TO ENTER A SLEEPING MODE

(75) Inventor: Wen-Ta Cheng, Jhonghe (TW)

(73) Assignee: Quanta Computer Inc., Tao Yuan Shien (TW)

( * ) Notice: Subject to any disclaimer, the term of this patent is extended or adjusted under 35 U.S.C. 154(b) by 179 days.

(21) Appl. No.: 11/581,456

(22) Filed: Oct. 17, 2006

(65) Prior Publication Data

US 2008/0037210 A1  Feb. 14, 2008

(30) Foreign Application Priority Data

Aug. 11, 2006  (TW) .............................. 95214232 U

(51) Int. Cl.
  *G06F 1/16* (2006.01)
  *H05K 5/00* (2006.01)
  *H05K 7/00* (2006.01)
(52) U.S. Cl. ...................................... 361/683
(58) Field of Classification Search ................ 361/683, 361/726; 200/50.1, 61.7, 16 D
See application file for complete search history.

(56) References Cited

U.S. PATENT DOCUMENTS

| | | | | |
|---|---|---|---|---|
| 5,612,520 A | * | 3/1997 | Toedtman et al. | 200/16 D |
| 6,044,473 A | * | 3/2000 | Kim | 713/320 |
| 6,243,819 B1 | * | 6/2001 | Jung | 713/320 |
| 6,704,194 B2 | * | 3/2004 | Koo | 361/683 |
| 6,906,698 B2 | * | 6/2005 | Tachikawa et al. | 345/156 |
| 7,173,813 B2 | * | 2/2007 | Wu | 361/679 |
| 7,181,238 B2 | * | 2/2007 | Chiang | 455/556.1 |
| 2006/0170223 A1 | * | 8/2006 | Homer et al. | 292/102 |

* cited by examiner

*Primary Examiner*—Hae Moon Hyeon
(74) *Attorney, Agent, or Firm*—Rabin & Berdo, PC

(57) ABSTRACT

A sleeping device is installed in a notebook computer with a mainframe and a flat panel display. The sleeping device includes a tab, an opening, a printed circuit board and a resilient metal. The tab is secured to the flat panel display. The opening is formed on an upper plate of the mainframe. The printed circuit board is disposed on a lower plate of the mainframe. Two conductive coatings are disposed on the printed circuit board. The resilient metal is disposed between the upper plate and the printed circuit board. The resilient metal is secured on the upper plate at one end to suspend an opposite end. When the flat panel display folds against the mainframe, the tab passes through the opening to press the resilient metal down such that the contact sections are in contact with two conductive coatings to enable the notebook computer to enter a sleeping mode.

6 Claims, 6 Drawing Sheets

DEVICE ENABLING A NOTEBOOK COMPUTER TO ENTER A SLEEPING MODE

RELATED APPLICATIONS

The present application is based on, and claims priority from, Taiwan Application Serial Number 95214232, filed on Aug. 11, 2006, the disclosure of which is hereby incorporated by reference herein in its entirety.

BACKGROUND

1. Field of Invention

The present invention relates to a notebook computer. More particularly, the present invention relates to a device that enables a notebook computer to enter a sleeping mode.

2. Description of Related Art

In order to save an idle computer power cost, minimum power is necessary to maintain a memory, i.e. DRAM or SRAM, to keep data. In such a state the computer is said to be in a sleeping mode. Most desktop computers are switched into a sleeping mode by means of a keyboard or a mouse, or after a specified period of time. A notebook computer is usually switched into a sleeping mode when its flat panel display folds against its mainframe.

Referring to FIG. 1 and FIG. 2, which illustrate a conventional sleeping device installed in a notebook computer. The sleeping device 100 has a pillar 112, partially installed in a housing 110, which is built inside the mainframe 212 of a notebook computer. An exposed portion of the pillar 112 is pressed, thereby triggering a computer into a sleep mode when a flat panel display 210 folds against the mainframe 212. A spring 114 disposed in the housing 110 restores the pillar 112 to an original (upper) position (thus, the sleeping mode is not triggered) when the flat panel display 210 unfolds away from the mainframe 212.

The pillar 112 of the sleeping device 100 is employed to trigger a computer into a sleep mode. Because the pillar 112 is exposed by the housing of the notebook, similar action other than the flat panel display 210 folding against the mainframe 212 may also press or trigger a computer to enter a sleep mode, i.e. a finger touch or an electrostatic discharge.

SUMMARY

It is therefore an objective of the present invention to provide a device to enable a notebook computer to enter a sleeping mode.

In accordance with the foregoing and other objectives of the present invention, a sleeping device is installed in a notebook computer with a mainframe and a flat panel display. The flat panel display is pivotally connected with the mainframe such that the flat panel display can fold against or unfold away from the mainframe. The sleeping device includes a tab, an opening, a printed circuit board and a resilient metal. The tab is secured to the flat panel display. The opening is formed on an upper plate of the mainframe. The printed circuit board is disposed on a lower plate of the mainframe. Two conductive coatings are disposed on the printed circuit board. The resilient metal is disposed between the upper plate and the printed circuit board. The resilient metal is secured on the upper plate at one end to suspend an opposite end. When the flat panel display folds against the mainframe, the tab passes through the opening to press the resilient metal down such that the contact sections are in contact with two conductive coatings to enable the notebook computer to enter a sleeping mode.

According to another embodiment, a sleeping device is installed in a notebook computer with a mainframe and a flat panel display. The flat panel display is pivotally connected with the mainframe such that the flat panel display can fold against or unfold away from the mainframe. The sleeping device includes a hook, an opening, a resilient metal and a sleeping enabling device. The hook is disposed on the flat panel display. An opening is formed on an upper plate of the mainframe. The resilient metal is secured on the upper plate at one end to suspend an opposite end. The opposite end has a concave section. When the flat panel display folds against the mainframe, the hook passes through the opening to press the concave section of the resilient metal down such that the contact sections are in contact with the sleeping enabling device to enable the notebook computer to enter a sleeping mode.

Thus, the present invention provides a sleeping device hidden in a housing of a notebook computer. Besides, the sleeping device has a resilient metal with an insulated coating. The sleeping device will not be triggered by any action other than the flat panel display folding against the mainframe.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
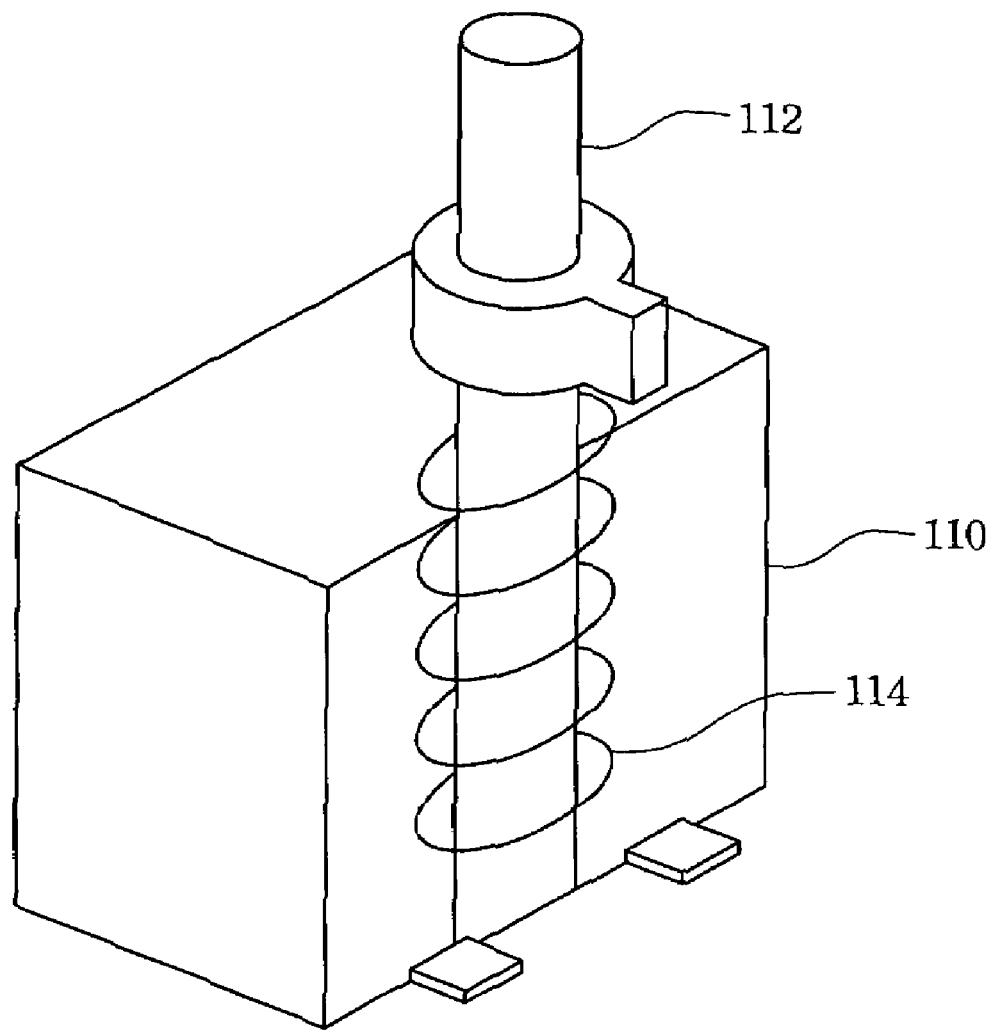
FIG. 1 illustrates a conventional sleeping device of a notebook computer.
Figure 2:
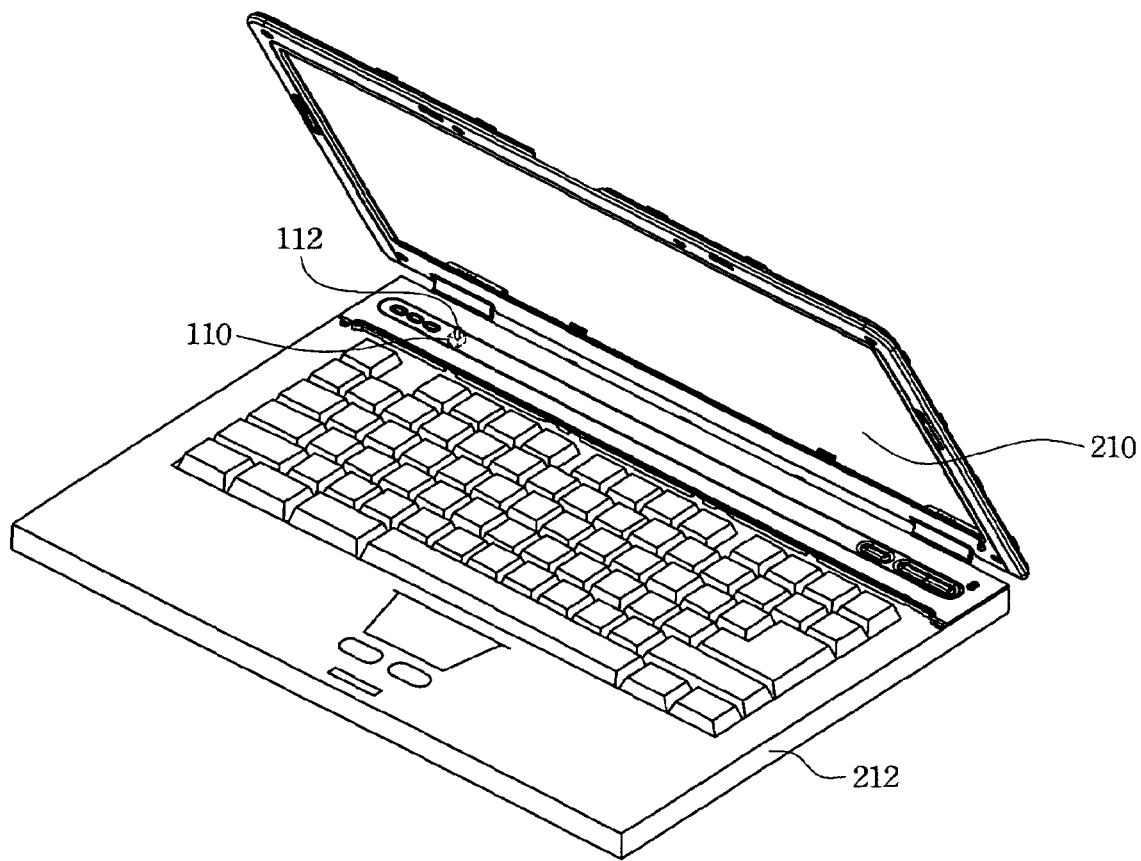
FIG. 2 illustrates a conventional sleeping device installed in a housing of a notebook computer.

Reference will now be made in detail to the present preferred embodiments of the invention, examples of which are illustrated in the accompanying drawings. Wherever possible, the same reference numbers are used in the drawings and the description to refer to the same or like parts.

Figure 3:
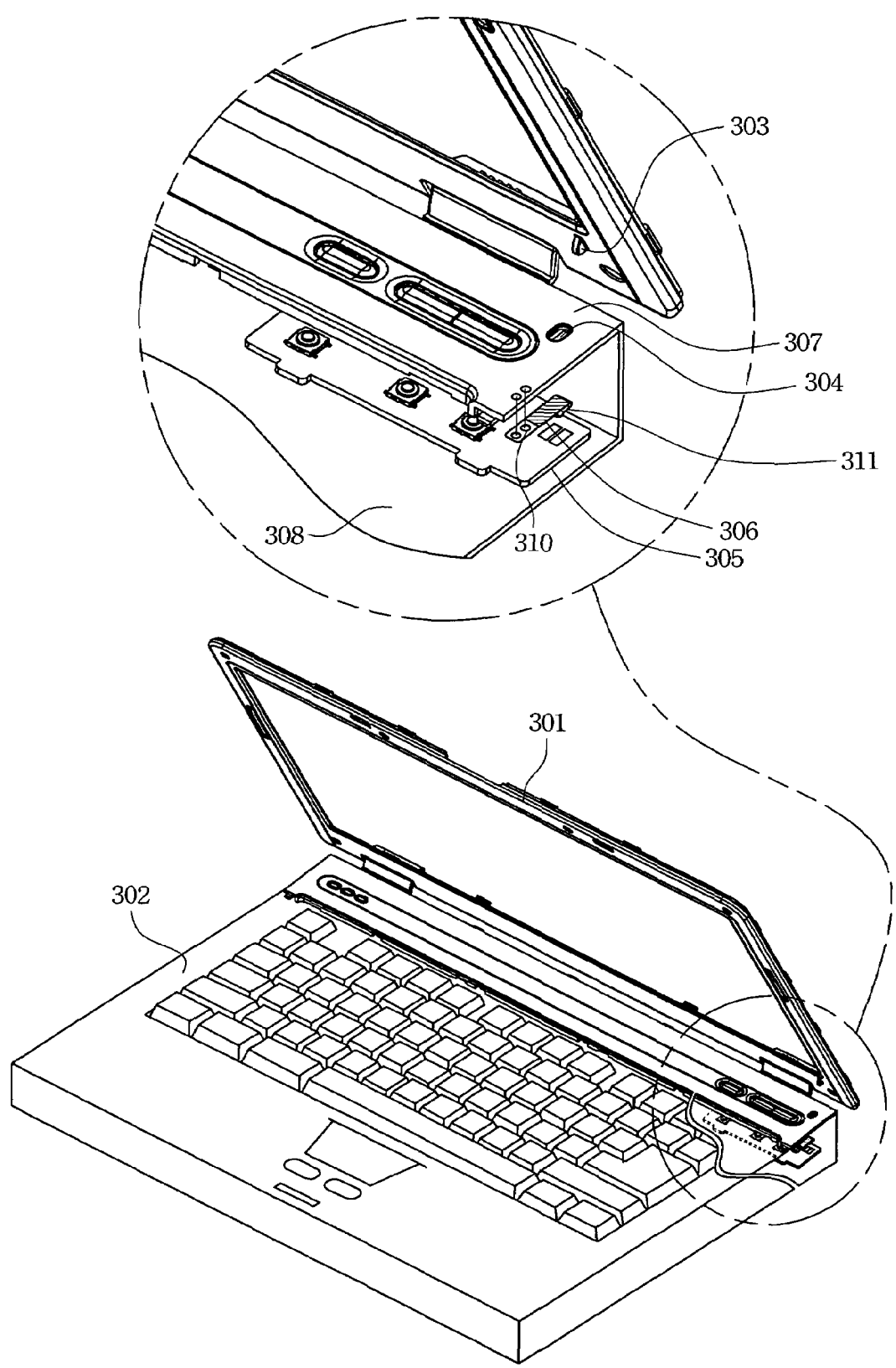
FIG. 3 illustrates a sleeping device of a notebook computer according one preferred embodiment of the present invention.
Figure 4:
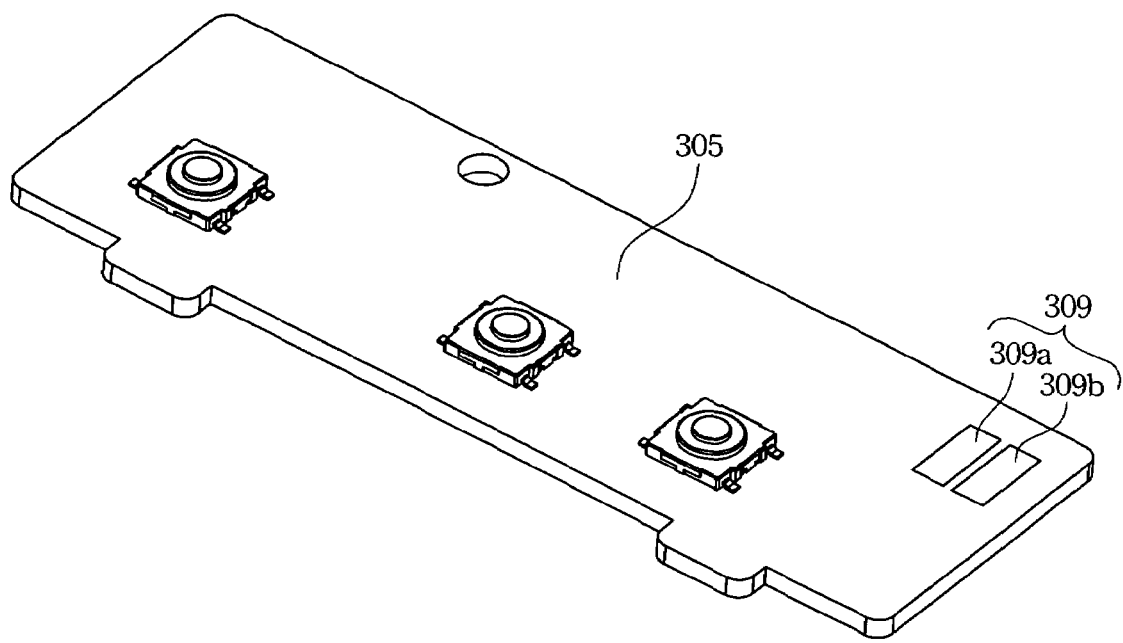
FIG. 4 illustrates a printed circuit board according one preferred embodiment of the present invention.
Figure 5:
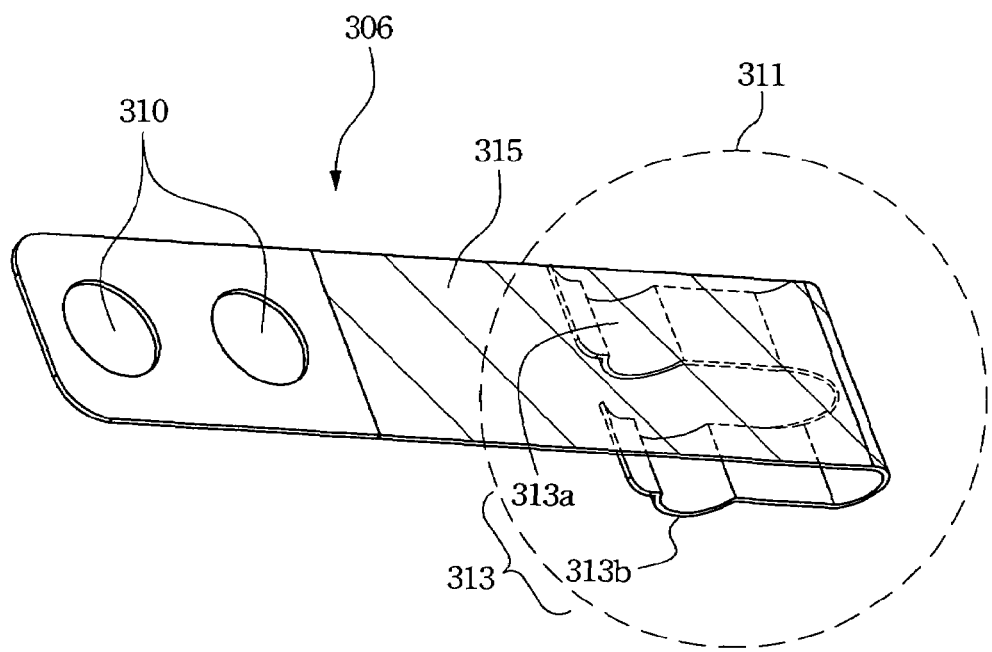
FIG. 5 illustrates a resilient metal according one preferred embodiment of the present invention.

Referring to FIGS. 3, 4 and 5, a sleeping device and its components are illustrated according to one preferred embodiment of the present invention. This notebook computer has a mainframe 302 and a flat panel display 301, i.e. a liquid crystal display, wherein the flat panel display 301 is pivotally connected with the mainframe such that the flat panel display can fold against or unfold away from the mainframe 302. The sleeping device includes a tab 303, an opening 304, a printed circuit board 305 and a resilient metal 306.

The tab 303 is secured to the flat panel display 301. The tab 303 is aligned with the opening 304 formed on an upper plate 307 of the mainframe 302 when the flat panel display can fold against the mainframe 302.

The resilient metal 306 is secured to and under the upper plate 307 of the mainframe 302 by fastening bolts (not illustrated) through screw holes 310. The resilient metal 306 is secured to the upper plate 307 at one end to suspend an opposite end as a trigger part 311. The trigger part 311 are also aligned with the opening 304 such that the tab 303 can pass through the opening 304 to press the resilient metal 306 down when the flat panel display 301 folds against the mainframe 302.

The printed circuit board 305 is disposed on a lower plate 308 of the mainframe 302. Two conductive coatings 309a and 309b are disposed on the printed circuit board 305.

Referring to FIG. 5, a detailed view of the resilient metal 306 is illustrated. An insulated coating 315 is formed on the resilient metal 306 for electrical insulation from the tab 303 when the tab 303 is in contact with the resilient metal 306. Thus, the insulated coating 315 blocks an electrostatic discharge. The resilient metal 306 is further U-bent and two contact sections 313a and 313b are formed.

Figure 6:
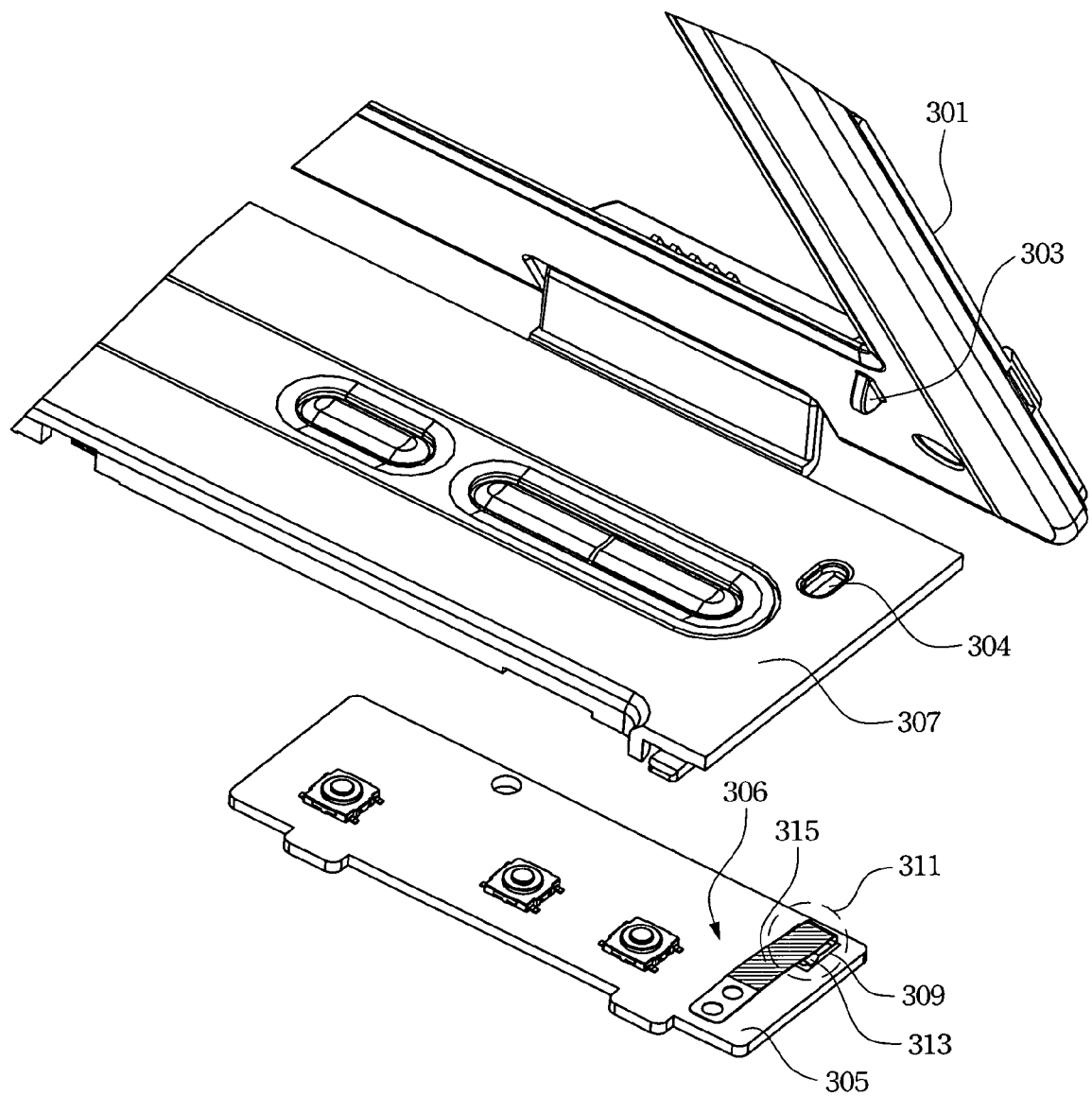
FIG. 6 illustrates an exploded view of a sleeping device according one preferred embodiment of the present invention.

Referring FIGS. 4, 5 and 6, the contact sections 313a and 313b are in contact with conductive coatings 309a and 309b when the trigger part 311 is pressed down by the tab 303. Two conductive coatings 309a and 309b are hence shorted to trigger the notebook computer into a sleeping mode. When the trigger part 311 is not pressed down by the tab 303 (the flat panel display unfolds away from the mainframe 302), two conductive coatings 309a and 309b are opened again to exit the sleeping mode.

Figure 7:
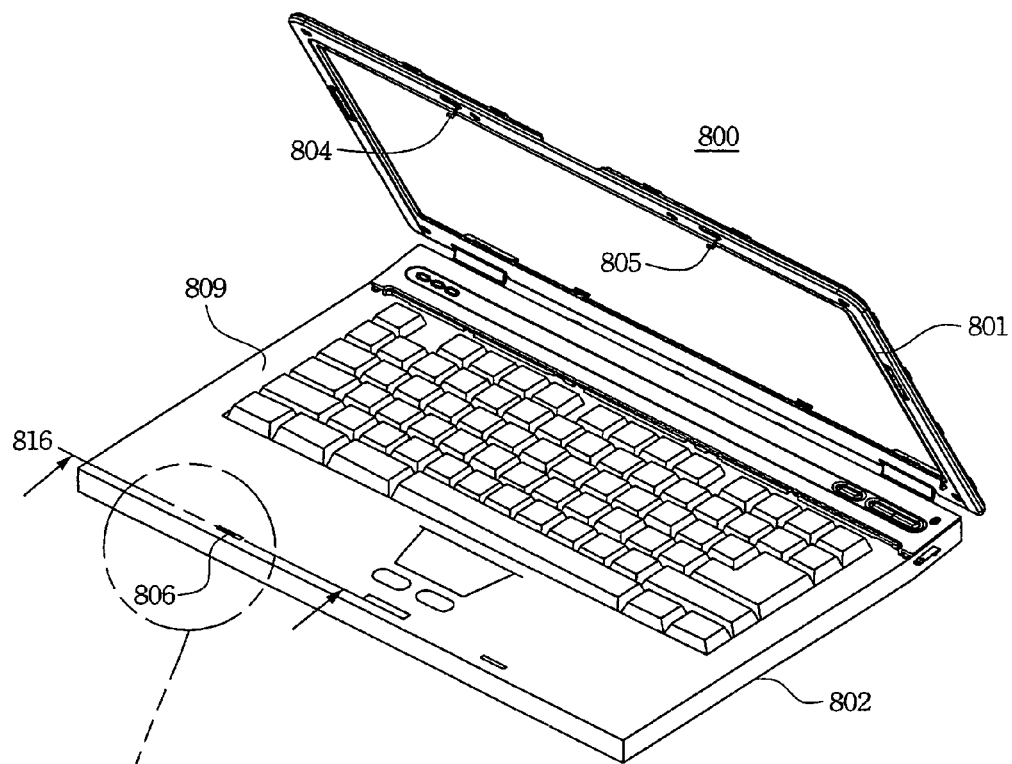
FIG. 7 illustrates a sleeping device installed in a notebook computer according another preferred embodiment of the present invention.
Figure 8:
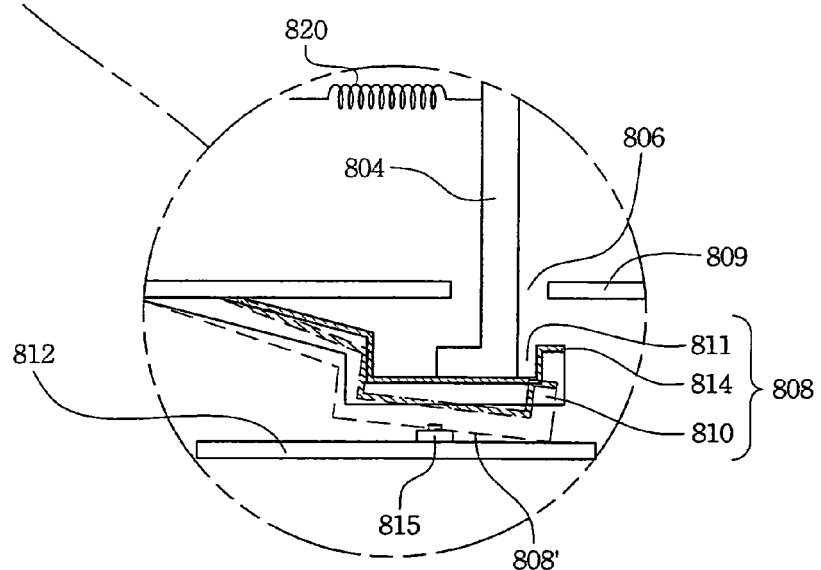
FIG. 8 is a cross-sectional view taken along the line 816 to illustrate a sleeping device according another preferred embodiment of the present invention.

FIG. 7 illustrates a sleeping device installed in a notebook computer according another preferred embodiment of the present invention. FIG. 8 is a cross-sectional view taken along the line 816 to illustrate the sleeping device.

The notebook computer 800 has a mainframe 802 and a flat panel display 801, i.e. a liquid crystal display, wherein the flat panel display 801 is pivotally connected with the mainframe 802 such that the flat panel display 801 can fold against or unfold away from the mainframe 802. When the flat panel display 801 completely folds against the mainframe 802, hooks 804 and 805 lock the flat panel display 801. The sleeping device includes a hook 804, an opening 806, a switch 815 and a resilient metal 808.

The hook 804 is secured to the flat panel display 801. The hook 804 is aligned with the opening 806 formed on an upper plate 809 of the mainframe 802 when the flat panel display 801 folds against the mainframe 802.

The resilient metal 808 is secured to and under the upper plate 809 of the mainframe 802. The resilient metal 808 is secured to the upper plate 809 at one end to suspend an opposite end. The opposite end of the resilient metal 808 has a concave section 811 and a trigger part 810. The concave section 811 has an insulated coating 814 for electrical insulation from the hook 804 when the hook 804 is in contact with the concave section 811. Thus, the insulated coating 814 blocks an electrostatic discharge. The concave section 811 is aligned with the opening 806 such that the hook 804 can pass through the opening 806 to press the resilient metal 808 down when the flat panel display 801 folds against the mainframe 802.

The switch 815 is installed on a printed circuit board 812, which is built inside the mainframe 802. When the resilient metal 808 is pressed down to the position 808' by the hook 804, a sleeping device, i.e. the switch 815, is pressed to trigger the notebook computer 800 into a sleeping mode. The hook 804 also executes the lock function, i.e. locking the flat panel display 801 on the mainframe 802 because a spring 820 is attached to the hook 804 and provides a pull force to achieve such purposes.

According to preferred embodiments, the present invention provides a sleeping device hidden in a housing of a notebook computer. Besides, the sleeping device has a resilient metal with an insulated coating. The sleeping device is not triggered by any action other than the flat panel display folding against the mainframe.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sleeping device installed in a notebook computer, having a mainframe and a flat panel display, the flat panel display being pivotally connected with the mainframe such that the flat panel display folds against or unfolds away from the mainframe, the sleeping device comprising:

a tab, secured to the flat panel display;

an opening, formed on an upper plate of the mainframe;

a printed circuit board, disposed on a lower plate of the mainframe;

two conductive coatings, disposed on the printed circuit board; and a resilient metal, disposed between the upper plate and the printed circuit board, the resilient metal being secured on the upper plate at one end to suspend an opposite end, the opposite end having two contact sections, when the flat panel display folds against the mainframe, the tab passes through the opening to press the resilient metal down such that the contact sections are in contact with the conductive coatings to enable the notebook computer to enter a sleeping mode.

2. The sleeping device of claim 1, wherein the resilient metal has an electrically insulated coating for the tab to contact.

3. A sleeping device installed in a notebook computer, having a mainframe and a flat panel display, the flat panel display being pivotally connected with the mainframe such that the flat panel display folds against or unfolds away from the mainframe, the sleeping device comprising:

a hook, disposed on the flat panel display;

an opening, formed on an upper plate of the mainframe;

a sleeping enabling device disposed within the mainframe of the notebook computer; and a resilient metal, secured on the upper plate at one end to suspend an opposite end, the opposite end having a concave section, when the flat panel display folds against the mainframe, the hook passes through the opening to press the concave section of the resilient metal down such that the opposite end of the resilient metal is in contact with the sleeping enabling device to enable the notebook computer to enter a sleeping mode.

4. The sleeping device of claim 3, wherein the resilient metal has an electrically insulated coating on the concave section.

5. The sleeping device of claim 3, wherein the sleeping enabling device is a switch installed on a printed circuit board.

6. The sleeping device of claim 3, further comprising a spring attached to the hook such that the hook is driven to lock the flat panel display after the flat panel display completely folds against the mainframe.

* * * * *